United States Patent
Debien et al.

(10) Patent No.: US 9,018,333 B2
(45) Date of Patent: Apr. 28, 2015

(54) POLYISOCYANATE COMPOSITION

(75) Inventors: Christiaan Debien, Holsbeek (BE);
Christian Esbelin, Schaerbeek (BE);
Hans Verbeke, Lubbeek (BE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/264,796

(22) PCT Filed: Apr. 6, 2010

(86) PCT No.: PCT/EP2010/054492
§ 371 (c)(1),
(2), (4) Date: Oct. 17, 2011

(87) PCT Pub. No.: WO2010/121898
PCT Pub. Date: Oct. 28, 2010

(65) Prior Publication Data
US 2012/0046436 A1 Feb. 23, 2012

(30) Foreign Application Priority Data

Apr. 21, 2009 (EP) .................................... 09158307

(51) Int. Cl.
*C08G 18/22* (2006.01)
*C08G 18/00* (2006.01)
*C08G 18/78* (2006.01)
*C08G 18/28* (2006.01)
*C08G 18/40* (2006.01)
*C08G 18/79* (2006.01)
*C08G 18/58* (2006.01)
*C08G 59/40* (2006.01)

(52) U.S. Cl.
CPC .......... *C08G 18/003* (2013.01); *C08G 18/7831* (2013.01); *C08G 18/78* (2013.01); *C08G 18/58* (2013.01); *C08G 59/4021* (2013.01); *C08G 59/4028* (2013.01); *C08G 18/225* (2013.01); *C08G 18/2865* (2013.01); *C08G 18/4045* (2013.01); *C08G 18/797* (2013.01); *C08G 2105/02* (2013.01)

(58) Field of Classification Search
CPC .... C08G 18/7831; C08G 18/78; C08G 18/58; C08G 59/4021; C08G 59/4028
USPC ............ 252/182.2, 182.1; 528/48, 49, 52, 57
See application file for complete search history.

(56) References Cited

U.S. PATENT DOCUMENTS

| 3,846,315 | A | * | 11/1974 | Stanton et al. | 508/176 |
| 4,658,007 | A | | 4/1987 | Marks et al. | |
| 5,086,150 | A | | 2/1992 | Frauendorf et al. | |
| 5,430,112 | A | * | 7/1995 | Sakata et al. | 525/526 |
| 6,399,698 | B1 | | 6/2002 | Petrovic et al. | |
| 8,088,862 | B2 | * | 1/2012 | Reimann et al. | 524/590 |
| 2003/0176568 | A1 | * | 9/2003 | Onoda et al. | 524/589 |

FOREIGN PATENT DOCUMENTS

EP  1 188 779 A1  3/2002

OTHER PUBLICATIONS

Huntsman Technical Bulletin Jeffamine M-2005 Polyetheramine. http://www.huntsman.com/portal/page/portal/performance_products/Media%20Library/a_MC348531CFA3EA9A2E040EBCD2B6B7B06/Products_MC348531D0B9FA9A2E040EBCD2B6B7B06/Amines_MC348531D0BECA9A2E040EBCD2B6B7B06/Polyetheramines%20%20%20JE_MC348531D0E07A9A2E040EBCD2B6B7B06/Monoamine%20products_MC34853.*
G. Woods, ICI Polyurethanes Handbook, $2^{nd}$ Ed. 1990, p. 32-35.
Sheath, Jignesh P.; Aneja, Ashish; and Wilkes, Garth L. "Exploring long-range connectivity of the hard segment phase in model tri-segment oligomeric polyurethanes via lithium chloride" *Polymer* 45 (2004), pp. 5979-5984.
Pankratov, V. A., Frenkel, TS. M.; and Fainieib, A. M.; "2-Oxazolidinones", *Russian Chemical Reviews* 52 (6), 1983, pp. 576-593.
Yang Juan, Wang Gui-You, Hu Chun-Pu; "Influence of LiCl on the morphology, structure and properties of aliphatic polyurethaneurea" *Journal of East China University of Science and Technology (Natural Science Edition)* Vo. 32, No. 11, pp. 1293-1294.

* cited by examiner

*Primary Examiner* — Michael L Leonard
(74) *Attorney, Agent, or Firm* — Robert A. Diaz

(57) ABSTRACT

Polyisocyanate composition comprising a polyisocyanate, a lithium halide and a urea compound, wherein the number of moles of lithium halide per isocyanate equivalent ranges of from 0.0001-0.04 and the number of urea+biuret equivalents per isocyanate equivalent of from 0.0001-0.4. Process for making such composition. Curable composition comprising this polyisocyanate composition and an epoxy resin. Polyisocyanurate made from this curable composition.

8 Claims, No Drawings

POLYISOCYANATE COMPOSITION

CROSS-REFERENCE TO RELATED APPLICATIONS

This application is the National Phase of International Application PCT/EP2010/054492 filed Apr. 6, 2010 which designated the U.S. and which claims priority to European App. Serial No. 09158307.0 filed Apr. 21, 2009. The noted applications are incorporated herein by reference.

The present invention relates to a polyisocyanate composition, to a process for making such a composition, to a curable composition wherein the polyisocyanate composition according to the present invention is used, to a process for making such curable composition, to a polyisocyanurate material made or obtainable from such curable composition and to a process for making such polyisocyanurate materials.

In the past much research has been devoted to the development of polyisocyanate compositions which are stable or which have a long pot life under ambient conditions and which react fast and cure fast once activated. Existing systems, like epoxy systems and polyester systems, need several hours of curing at rather high temperatures and, after curing, cooling needs to be conducted slowly in order to avoid stress cracking and shrinkage, especially for polyester systems. Further, these existing systems show a limited applicability since often applied ultra-violet curing only affects a limited, thin layer of these systems.

Surprisingly we have found a novel polyisocyanate composition which is stable under ambient conditions and which together with certain isocyanate-reactive compounds provides a curable composition which has a long pot-life and reacts and cures fast at a moderate temperature, once this reaction and curing is allowed to start. After curing, cooling may be conducted fast with less stress cracking and/or shrinkage.

Therefore the present invention relates to a polyisocyanate composition comprising a polyisocyanate, a lithium halide and a urea compound, the urea compound having an average molecular weight of 500-15000 and optionally comprising biuret groups, the number of moles of lithium halide per isocyanate equivalent ranging of from 0.0001-0.04 and the number of urea+biuret equivalents per isocyanate equivalent of from 0.0001-0.4.

The use of lithium chloride and compounds comprising urea groups has been disclosed by Sheth, Aneja and Wilkes in Polymer 45 (2004) 5979-5984. They studied the influence of the extent of hydrogen bonding in mediating the long-range connectivity and percolation of the hard segment phase in model tri-segment oligomeric polyurethanes using LiCl as a molecular probe.

In U.S. Pat. No. 5,086,150 an isocyanate-terminated prepolymer is reacted with a diamine in the presence of a rather high amount of LiCl to prepare an elastomer solution which is stable for at least two days. At the beginning of the reaction the number of moles of lithium chloride per isocyanate equivalent is rather high; the lithium chloride is used to act as a solubilizer. At the beginning of the reaction, the composition is not stable and does not contain urea and at the end of the reaction it is an elastomer and not an isocyanate composition anymore. The product obtained is an elastomer solution used for making threads and films.

The polyisocyanate composition according to the present invention is very suitable to make a curable composition together with epoxy compounds.

The use of isocyanates and epoxides together with LiCl has been disclosed in Russian Chemical Reviews 52(6) 1983, 576-593. The reaction is influenced by the nature of the catalyst. In the presence of metal halides an activated complex is formed which ultimately gives an oxazolidone. One of the side reactions is the formation of isocyanurate rings which decompose to oxazolidone on treatment with epoxides. Further it has been disclosed therein that epoxides are capable of cleaving urea linkages with formation of oxazolidones.

U.S. Pat. No. 4,658,007 discloses a process for preparing oxazolidone containing polymer using organoantimony iodide catalyst by reacting a polyisocyanate and a polyepoxide.

U.S. Pat. No. 5,326,833 discloses a composition comprising a polyisocyanate, an epoxide and a catalyst consisting of a solution of an alkali halide, like LiCl, in a polyoxyalkylenic compound. These compositions are able to gel rapidly between 0° C. and 70° C.

Juan et al discuss in the Journal of East China University of Science and Technology Vol. 32, No 11, 2006, 1293-1294 the influence of LiCl on the morphology structure and properties of polyurethane-urea. It shows that the viscosity of polyurethane urea solutions first decreases and subsequently increases. The polyurethane urea was made by reacting polyepoxypropane glycol and isophorone diisocyanate with excess polyisocyanate.

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.
   It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.

The polyisocyanate used for making the polyisocyanate composition according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec® 2185, Suprasec® 5025 and Suprasec® DNR ex Huntsman.

The prepolymers (polyisocyanate 5)) are also widely known and commercially available. Examples are Suprasec® 2054 and Suprasec® 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The lithium halide used in the polyisocyanate composition according to the present invention is preferably used in an amount of 0.00015-0.025 and most preferably of 0.0005-0.02 moles per isocyanate equivalent and preferably is selected from lithium chloride and lithium bromide. Lithium chloride is most preferred.

The urea compound used in the polyisocyanate composition according to the present invention is preferably used in such an amount that the number of urea+biuret equivalents is 0.001-0.2 and most preferably 0.001-0.05 per isocyanate equivalent. Most preferably the number of urea+biuret equivalents in the urea compound in the polyisocyanate composition per mole of lithium halide ranges of from 0.5-60 and most preferably of from 0.5-30. The urea compound should not comprise other isocyanate-reactive groups (i.e. other than urea groups).

The urea compound used in the polyisocyanate composition according to the present invention has an average molecular weight of 500-15000 and preferably of 600-10000 and most preferably of 800-8000. Such urea compounds are prepared by reacting polyisocyanates and amines.

The polyisocyanates used to prepare such urea compound may be selected from the polyisocyanates mentioned above. The preferences mentioned above apply here as well. Most preferably polyisocyanates 1) and 2) and mixtures thereof are used. The polyisocyanate used to make the polyisocyanate composition according to the present invention and the polyisocyanate used to make the urea compound may be the same or different.

The amines used to prepare the urea compounds may be monoamines or polyamines. Preferably monoamines, optionally comprising a small amount of polyamines, are used. The average amine functionality of such mixtures preferably is at most 1.2. Most preferably only monoamines are used. Such amines preferably are primary amines.

The molecular weight of the amines is selected in such a way that once reacted with the selected polyisocyanate the molecular weight of the urea compound obtained falls within the above ranges. In general the molecular weight of the amines ranges of from 200-7500 and preferably of from 200-4500 and most preferably of from 200-3000.

The amines may be selected from those known in the art like amine-terminated hydrocarbons, polyesters, polyethers, polycaprolactones, polycarbonates, polyamides and mixtures thereof. Most preferred are amine-terminated polyoxyalkylene monoamines and more in particular polyoxyethylene polyoxypropylene monoamines. Preferably the oxypropylene content in these polyoxyalkylene monoamines is at least 50 and preferably at least 75% by weight calculated on the total weight of the monoamine molecule. Preferably the polyoxyalkylene monoamines have a monoalkyl group at the other end of the polymer chain, the alkyl group having 1-8 and preferably 1-4 carbon atoms. Such monoamines are known in the art. They are made by alkoxylating an alkylmonoalcohol having 1-8 carbon atoms and by subsequently converting the polyoxyalkylene monol into the monoamine. Such monoamines are commercially available. Examples are Jeffamine® M-600 and M-2005, both ex Huntsman (Jeffamine is a trademark of the Huntsman Corporation or an affiliate thereof which has been registered in one or more but not all countries). Mixtures of monoamines may be used as well.

In view of the above, a most preferred urea compound used in the polyisocyanate composition according to the present invention is a urea compound obtained by reacting a methylene diphenyl diisocyanate or a polyisocyanate comprising a methylene diphenyl diisocyanate or a mixture of these polyisocyanates and a polyoxyalkylene monoamine, comprising oxypropylene groups in an amount of at least 75% by weight calculated on the total weight of the monoamine molecule and having an average molecular weight of 200-3000 and wherein the amine is a primary amine.

The polyisocyanate and the monoamine are combined and mixed and allowed to react. The reaction is exothermic and therefore does not require heating and/or catalysis, although heat and/or catalysis may be applied if this is regarded as convenient. For instance it may be convenient to pre-heat the polyisocyanate and/or the monoamine to 40-60° C. and to mix them then. After mixing, the temperature of the reacting mixture preferably is kept below 80° C. in order to avoid side reactions, like e.g. biuret formation. In order to ensure that all the amine reacts, a slight excess of polyisocyanate may be used; conducting the reaction at an index of 101-110 is preferred therefore. After at most 1 hour the reaction may be regarded as complete and the urea compound is ready for use to make the polyisocyanate composition according to the present invention.

Since a small excess of polyisocyanate is used in preparing the urea compound and since the urea compound in a next step is added to a relatively large amount of polyisocyanate, some of the urea groups might be converted to biuret groups. By controlling the reaction temperature and the temperature of the subsequent mixing steps, such biuret formation is avoided as much as possible. In general, the number of urea groups which are converted into biuret groups is less than 25% and preferably less than 10%.

The present invention is further concerned with a process for making the polyisocyanate composition according to the present invention by mixing the polyisocyanate, the urea compound and the lithium halide in any order under ambient conditions or at elevated temperature, e.g. at 40-70° C. Preferably the lithium halide is premixed with the urea compound and this mixture is subsequently added to the polyisocyanate and mixed. Before mixing the lithium halide and the urea compound, it may be convenient to dissolve the lithium halide in a solvent, like in an organic solvent like an alcohol, e.g. methanol or ethanol. The dissolved lithium halide is then added to the urea compound. Subsequently the solvent may be stripped off if desired. Premixing and mixing is conducted under ambient conditions or at elevated temperature, e.g. at 40-70° C. and is done by means of normal stirring. The relative amounts of the polyisocyanate, the urea compound and the lithium halide are chosen in such a way that the final polyisocyanate composition according to the invention has the relative amounts of isocyanate groups, urea groups and lithium halide as has been described before. Without wishing to be bound to any theory, the lithium halide is believed to be present in dissociated form, complexed with the urea group as a so-called bidentate complex.

The polyisocyanate composition according to the invention may be used to make a curable composition together with an epoxy resin.

Therefore the present invention is further concerned with a curable composition comprising a polyisocyanate composition according to the invention and an epoxy resin, wherein the amount of epoxy resin is such that the number of epoxy equivalents per isocyanate equivalent ranges from 0.003-1 and preferably from 0.003-0.5 and most preferably from 0.005-0.25.

In principle, all epoxy resins which are customary in epoxy resin technology and are liquid at room temperature can be used in preparing a curable composition according to the present invention. It is also possible to use a mixture of epoxy resins said mixture being liquid at room temperature. In the context of the present invention, room temperature means a temperature of 20-25° C.

Examples of epoxy resins are:

I) Polyglycidyl and poly($\beta$-methylglycidyl) esters, obtainable by reacting a compound having at least two carboxyl groups in the molecule and, respectively, epichlorohydrin and $\beta$-methylepichlorohydrin. The reaction is expediently effected in the presence of bases.

Aliphatic polycarboxylic acids can be used as the compound having at least two carboxyl groups in the molecule. Examples of such polycarboxylic acids are oxalic acid, succinic acid, glutaric acid, adipic acid, pimelic acid, suberic acid, azelaic acid and dimerized or trimerized linoleic acid.

However, cycloaliphatic polycarboxylic acids, such as, for example, tetrahydrophthalic acid, 4-methyltetrahydrophthalic acid, hexahydrophthalic acid or 4-methylhexa-hydrophthalic acid, may also be used.

Furthermore, aromatic polycarboxylic acids, such as, for example, phthalic acid, isophthalic acid or terephthalic acid, may be used.

II) Polyglycidyl or poly($\beta$-methylglycidyl)ethers, obtainable by reacting a compound having at least two free alcoholic hydroxyl groups and/or phenolic hydroxyl groups with epichlorohydrin or $\beta$-methylepichlorohydrin under alkaline conditions or in the presence of an acidic catalyst with subsequent treatment with alkali.

The glycidyl ethers of this type are derived, for example, from acyclic alcohols, for example from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol, and from polyepichlorohydrins. Further glycidyl ethers of this type are derived from cycloaliphatic alcohols, such as 1,4-cyclohexanedimethanol, bis(4-hydroxycyclohexyl)methane or 2,2-bis(4-hydroxycyclohexyl)propane, or from alcohols which contain aromatic groups and/or further functional groups, such as N,N-bis(2-hydroxyethyl)aniline or p,p'-bis (2-hydroxyethylamino)-diphenylmethane.

The glycidyl ethers may also be based on mononuclear phenols, such as, for example, p-tert-butylphenol, resorcinol or hydroquinone, or on polynuclear phenols, such as, for example, bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols which are unsubstituted or substituted by chlorine atoms or $C_1$-$C_9$-alkyl groups, such as, for example, phenol, 4-chlorophenol, 2-methylphenol or 4-tert-butylphenol.

III) Poly(N-glycidyl) compounds, obtainable by dehydrochlorination of the reaction products of epichlorohydrin with amines which contain at least two amine hydrogen atoms. These amines are, for example, aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, which are derived from dithiols, such as, for example, ethane-1,2-dithiol or bis(4-mercaptomethylphenyl) ether.

V) Cycloaliphatic epoxy resins, such as, for example, bis (2,3-epoxycyclopentyl)ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1, 3-bis(5,5-dimethyl-1-glycidylhydantoin-3-yl)propane.

Particularly preferred are those mentioned in I and II and most preferred are those mentioned in II.

The present invention is further concerned with a process for making the curable composition according to the present invention by mixing the polyisocyanate composition according to the present invention and the epoxy resin, wherein the amount of epoxy resin is such that the number of epoxy equivalents per isocyanate equivalent ranges from 0.003-1. The mixing preferably is conducted under ambient conditions.

The curable composition so obtained has a good stability under ambient conditions and even at lower temperatures. It is used to make a polyisocyanurate material by allowing it to react. Therefore the invention is further concerned with a polyisocyanurate material made by allowing a curable composition according to the present invention to react and with a polyisocyanurate material obtainable by allowing a curable composition according to the present invention to react and with a process for making these polyisocyanurate materials by allowing a curable composition according to the present invention to react. The start of the reaction may be accelerated by applying heat, like heating the curable composition to a temperature above 50° C. and preferably above 80° C. Then the curable composition cures fast (so-called snap-cure) while the temperature increases further (the reaction is exothermic).

Before curing it, the curable composition may be fed into a mould in order to give it a certain shape or into a cavity of an object in order to provide the object with a polyisocyanurate interior or onto a surface to provide such a surface with a polyisocyanurate cover or it may be used to repair an object and in particular a pipe by applying it onto the interior and/or the exterior surface of such an object or such a pipe (examples of such pipe repair have been described in U.S. Pat. Nos. 4,009,063, 4,366,012 and 4,622,196) or it may be used to bind materials as has been disclosed in WO 2007/096216.

Before the curable composition is cured, additives may be added to it or to its constituents. Examples of additives are polyols, other catalysts, blowing agents, surfactants, water scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers. If polyols are used then they are used in such an amount that the index of the curable composition remains above 150 and preferably above 300.

If desired the polyisocyanurate material according to the present invention may be subjected to post-curing.

The invention is illustrated with the following examples.

EXAMPLES

Chemicals Used

Jeffamine M-600: a monofunctional polyoxyethylene polyoxypropylene primary amine having a molecular weight of about 560 and an oxypropylene/oxyethylene ratio of about 9/1. Obtainable from Huntsman. In these examples referred to as M-600.

Jeffamine M-2005: a monofunctional polyoxyethylene polyoxypropylene primary amine having a molecular weight of about 2000 and an oxypropylene (PO)/oxyethylene (EO) ratio of 29/6. Obtainable from Huntsman. In these examples referred to as M-2005.

Jeffamine M-2070: as M-2005 but with PO/EO ratio of 10/33. In these examples referred to as M-2070.

Surfonamine L-100: a monofunctional polyoxyethylene polyoxypropylene primary amine having a molecular weight of about 1000 and a PO/EO ratio of 3/19; ex Huntsman. In these examples referred to as L-100. Surfonamine is a trademark of the Huntsman Corporation or an Affiliate thereof and has been registered in one or more but not all countries.

Suprasec 1306 polyisocyanate ex Huntsman: 4,4'-MDI. In these examples referred to as S1306.

Suprasec 2020 polyisocyanate: a uretonimine modified polyisocyanate ex Huntsman, in these examples indicated as S2020.

Suprasec 5025 polyisocyanate: a polymeric MDI ex Huntsman, in these examples indicated as S5025.

Alcupol R1610 polyol ex Repsol indicated herein as R1610.

Daltolac 8200 polyol ex Huntsman. Daltolac is a trademark of the Huntsman Corporation or an Affiliate thereof and has been registered in one or more but not all countries. Indicated herein as R200.

Daltocel F526 is a polyoxyethylene triol ex Huntsman; MW about 1300. Daltocel is a trademark of the Huntsman Corporation or an Affiliate thereof and has been registered in one or more but not all countries.

Voranol P400: polyol from DOW.

Tegostab B8466: silicon surfactant from Evonik.

$SiO_2$ filler: Millisil M6000 from Sibelco.

Araldite DY-T epoxide ex Huntsman, triglycidylether of trimethylolpropane, indicated herein as DY-T. Araldite is a trademark of the Huntsman Corporation or an Affiliate thereof and has been registered in one or more but not all countries.

Araldite DY-P epoxide: monoglycidylether of p-tert-butylphenol; herein indicated as DY-P; ex Huntsman.

Araldite DY-3601 epoxide: diglycidylether of polyoxypropylene glycol; herein indicated as DY-3601; ex Huntsman.

Araldite GY-783 epoxide: bisphenol A/F with monofunctional reactive diluent; herein indicated as GY-783; ex Huntsman.

In none of the following examples biuret formation was observed.

Example 1

Preparation of Polyisocyanate Compositions According to the Present Invention A number of moles of an amine, which was kept at 50° C., and a number of moles of a polyisocyanate 1, which was also kept at 50° C., were mixed and allowed to react for 1 hour, while stirring, so as to form a urea compound. The reaction temperature was kept at 80° C. An amount of salt was dissolved in an amount of ethanol while stirring.

This solution was added to the above prepared urea compound which was still kept at 80° C. Stirring was continued for about 15 minutes. A substantial amount of ethanol was stripped off by distillation at 85-95° C. The amount of the urea/salt mixture so obtained is given in below Table 1; together with the amount and type of amine, polyisocyanate 1 and salt used and the amount of ethanol used.

An amount of the so prepared urea/salt mixture (having a temperature of about 60° C.) was added to an amount of a polyisocyanate 2 and mixed so as to prepare a polyisocyanate composition according to the present invention.

In below Table 2 the amounts and types of the ingredients used are given together with the ratio of the number of urea+biuret equivalents per isocyanate equivalent and the number of moles of salt per isocyanate equivalent and the number of urea+biuret equivalents per mole of salt. Parts by weight is indicated as pbw.

TABLE 1

| Urea compounds | Amine type/ amount in moles | Poly-isocyanate 1 type/amount in moles | Salt type/ amount in grams | Ethanol/ amount in grams | Urea/salt mixture amount in grams |
|---|---|---|---|---|---|
| A | M-600/2 | S1306/1.04 | LiCl/23.9 | 125.3 | 1407.6 |
| B | M2005/2 | S1306/1.04 | LiCl/76.4 | 401.2 | 4506.7 |
| C | L100/2 | S1306/1.04 | LiCl/39.0 | 205.0 | 2302.7 |
| D | M2070/2 | S1306/1.04 | LiCl/76.4 | 401.2 | 4506.7 |
| E | M2005/6.4 | S1306/3.35 | LiCl/76.4 | 401.2 | 14260.8 |
| F | L100/3.3 | S1306/1.71 | LiCl/39.0 | 205.0 | 3772.1 |
| G | M2070/6.4 | S1306/3.35 | LiCl/76.4 | 401.2 | 14260.8 |
| H | M-600/2 | S1306/1.04 | LiBr/49.7 | 239.3 | 1433.4 |
| I | M-600/2 | S1306/1.04 | LiCl/48.6 | 255.0 | 1432.3 |
| J | M-600/2 | S1306/1.04 | LiCl/74.2 | 389.3 | 1457.8 |
| K | M-600/2 | S1306/1.04 | LiCl/100.7 | 528.5 | 1484.4 |
| L | M-600/2 | S1306/1.04 | LiCl/11.8 | 62.1 | 1457.6 |
| M | M-600/2 | S1306/1.04 | LiCl/4.7 | 24.7 | 1388.4 |
| N | M-600/2 | S1306/1.04 | LiCl/36.1 | 189.6 | 1419.8 |

TABLE 2

| Poly-isocyanate blends | Urea compound from table 1/ amount in pbw | poly-isocyanate 2 type/amount in pbw | Urea + biuret/ NCO ratio | Salt/ NCO ratio | Urea + biuret/ salt ratio |
|---|---|---|---|---|---|
| 1 | A/5 | S5025/95 | 0.0104 | 0.0029 | 3.65 |
| 2 | B/5 | S5025/95 | 0.0032 | 0.0029 | 1.13 |
| 3 | C/5 | S5025/95 | 0.0064 | 0.0029 | 2.22 |
| 4 | D/5 | S5025/95 | 0.0032 | 0.0029 | 1.13 |
| 5 | E/16.1 | S5025/95 | 0.0104 | 0.0029 | 3.65 |
| 6 | F/8.2 | S5025/95 | 0.0104 | 0.0029 | 3.65 |
| 7 | G/16.1 | S5025/95 | 0.0104 | 0.0029 | 3.65 |
| 8 | H/10 | S2020/85 | 0.0244 | 0.0066 | 3.65 |
| 9 | A/5 | S2020/95 | 0.0109 | 0.0030 | 3.65 |
| 10 | I/5 | S2020/95 | 0.0109 | 0.0060 | 1.82 |
| 11 | J/5 | S2020/95 | 0.0109 | 0.0090 | 1.22 |
| 12 | K/5 | S2020/95 | 0.0109 | 0.0120 | 0.91 |
| 13 | L/5 | S2020/95 | 0.0109 | 0.0015 | 7.30 |
| 14 | M/5 | S2020/95 | 0.0109 | 0.0006 | 18.25 |
| 15 | N/5 | S2020/95 | 0.0109 | 0.0045 | 2.43 |
| 16 | A/20 | S2020/95 | 0.0436 | 0.012 | 3.65 |
| 17 | A/10 | S2020/95 | 0.0218 | 0.006 | 3.65 |
| 18 | A/2.5 | S2020/95 | 0.0055 | 0.0015 | 3.65 |
| 19 | A/1 | S2020/95 | 0.0022 | 0.0006 | 3.65 |
| 20 | B/10 | S5025/95 | 0.0065 | 0.0057 | 1.13 |

Preparation of Curable Compositions and Polyisocyanurate Materials According to the Present Invention.

The compositions of Table 2 were mixed with epoxide (compositions) for 30 seconds and placed at room temperature in order to determine the pot-life by visual inspection. After determination of the pot-life the curable composition was allowed to react so as to prepare polyisocyanurate materials according to the present invention. The presence of isocyanurate groups was confirmed by Fourier Transformed InfraRed Spectroscopy (FTIRS). The epoxy compositions, in as far as used, were made by simple mixing of the epoxy type and the polyol or polyols.

The ingredients used, the amounts in parts by weight, the number of epoxy equivalents per isocyanate equivalent, the index and the pot-life are given in Table 3.

In the first column, A1 means that urea compound A (Table 1) was used and Polyisocyanate blend 1 (Table 2), and F6 means that urea compound F was used and polyisocyanate blend 6. For A9 8 different experiments were conducted with urea compound A and Polyisocyanate blend 9.

TABLE 3

| Curable compositions | Compositions from table 2/ amount in pbw | Epoxy type/ amount in pbw | Polyol type 1/ amount in pbw | Polyol type 2/ amount in pbw | Epoxy/NCO ratio | Index | Pot-life (hours) |
|---|---|---|---|---|---|---|---|
| A1 | 1/100 | DY-T/4 | P400/5 | R1610/5 | 0.0458 | 1866 | >8 |
| B2 | 2/100 | DY-T/4 | P400/5 | R1610/5 | 0.0458 | 1866 | 2 |
| C3 | 3/100 | DY-T/4 | P400/5 | R1610/5 | 0.0458 | 1866 | 3 |
| D4 | 4/100 | DY-T/4 | P400/5 | R1610/5 | 0.0458 | 1866 | 2 |
| E5 | 5/111.1 | DY-T/4 | P400/5 | R1610/5 | 0.0458 | 1866 | >8 |
| F6 | 6/103.2 | DY-T/4 | P400/5 | R1610/5 | 0.0458 | 1866 | 4 h 30 |
| G7 | 7/111.1 | DY-T/4 | P400/5 | R1610/5 | 0.0458 | 1866 | 6 |
| H8 | 8/95 | DY-T/4 | R1610/15 | x | 0.0535 | 1399 | 3 |
| A9-1 | 9/100 | DY-T/4 | R1610/15 | x | 0.0478 | 1564 | 4 |
| I10 | 10/100 | DY-T/4 | R1610/15 | x | 0.0478 | 1564 | 1 h 20 |
| J11 | 11/100 | DY-T/4 | R1610/15 | x | 0.0478 | 1564 | 1 h 15 |
| K12 | 12/100 | DY-T/4 | R1610/15 | x | 0.0478 | 1564 | 0 h 50 |
| L13 | 13/100 | DY-T/4 | R1610/15 | x | 0.0478 | 1564 | >9 h 30 |
| M14 | 14/100 | DY-T/4 | R1610/15 | x | 0.0478 | 1564 | >40 |
| A16 | 16/115 | DY-T/4 | R1610/15 | x | 0.0478 | 1564 | 2 h 30 |

TABLE 3-continued

| Curable compositions | Compositions from table 2/ amount in pbw | Epoxy type/ amount in pbw | Polyol type 1/ amount in pbw | Polyol type 2/ amount in pbw | Epoxy/NCO ratio | Index | Pot-life (hours) |
|---|---|---|---|---|---|---|---|
| A17 | 17/105 | DY-T/4 | R1610/15 | x | 0.0478 | 1564 | 3 h 45 |
| A18 | 18/97.5 | DY-T/4 | R1610/15 | x | 0.0478 | 1564 | 5 h 15 |
| A19 | 19/96 | DY-T/4 | R1610/15 | x | 0.0478 | 1564 | 8 h 30 |
| B20 | 20/105 | DY-T/4 | x | x | 0.0458 | ∞ | 3 |
| A9-2 | 9/100 | DY-T/12 | R200/6 | x | 0.1435 | 1646 | 2 |
| A9-3 | 9/100 | DY-T/8 | R200/6 | x | 0.0957 | 1646 | 2 h 30 |
| A9-4 | 9/100 | DY-T/4 | R200/6 | x | 0.0478 | 1646 | 4 h 30 |
| A9-5 | 9/100 | DY-T/2 | R200/6 | x | 0.0239 | 1646 | 10 |
| A9-6 | 9/100 | DY-T/1 | R200/6 | x | 0.0120 | 1646 | >17 |
| A9-7 | 9/100 | DY-P/3 | P400/10 | x | 0.0192 | 1444 | >10 |
| A9-8 | 9/100 | DY-3601/8 | P400/5 | x | 0.0303 | 2887 | 2 h 40 |
| N15 | 15/100 | GY-783/4 | R1610/15 | x | 0.0314 | 1564 | 4 | x means 'not used'

Example 2

Further Preparation of Polyisocyanurates According to the Present Invention 1) 5 pbw of Voranol P400, 5 pbw of Daltolac R200, 6 pbw of DY-T and 2 pbw of triisopropyl orthoformate were mixed. This mixture was mixed with 100 pbw of polyisocyanate blend 1 (Table 2), poured in a mould and cured for 1 hour in an oven which was kept at 80° C. The Tg and the E-modulus, both determined by differential mechanical thermal analysis, were 166° C. and 2570 MPa. FTIRS revealed the presence of isocyanurate groups. This polyisocyanurate material, according to the present invention, is suitable for use in pipe reparation.

2) 15 pbw of Alcupol R1610, 4 pbw of DY-T, 3 pbw of triisopropyl orthoformate and 12 pbw of SiO$_2$ filler were mixed. This mixture was added to a mixture of 95 pbw of S2020, 6 pbw of urea compound A (Table 1) and 1 pbw of Tegostab B8466 and mixed. The mixture so obtained was poured in a mould and cured in an oven which was kept at 80° C. The Tg and the E-modulus, both determined as in the previous experiment, were 267° C. and 2355 MPa. The presence of isocyanurate groups in this nice composite polyisocyanurate material was confirmed by FTIRS.

3) Experiment 2 was repeated with 5 pbw of urea compound A and 2 pbw of triisopropyl orthoformate and without Tegostab B8466 and filler. The polyisocyanurate (confirmed by FTIRS) obtained had a Tg of 195° C. and an E-modulus of 2475 MPa. The curable composition was suitable for resin infusion and in particular for resin transfer moulding.

4) Experiment 1 was repeated without Daltolac R200, with 4 pbw of DY-T and with 2.5 pbw of triisopropyl orthoformate. The polyisocyanurate (confirmed by FTIRS) obtained had a Tg of 159° C. and an E-modulus of 2800 MPa. The curable composition was particularly suitable for pipe repair applications.

The above experiments had the following ratios:

| Experiment | 1 | 2 | 3 | 4 |
|---|---|---|---|---|
| Salt/NCO ratio | 0.0029 | 0.0036 | 0.0029 | 0.0029 |
| Urea + biuret/NCO ratio | 0.0103 | 0.0129 | 0.0107 | 0.0103 |
| Epoxy/NCO ratio | 0.0687 | 0.0478 | 0.0478 | 0.0458 |
| Index | 1224 | 1564 | 1564 | 3014 |
| Urea + biuret/salt ratio | 3.6 | 3.6 | 3.6 | 3.6 |

Comparative Examples

1) Curable composition A1 was made without urea compound A. The Alcupol R1610 was used to dissolve the LiCl. The pot-life of the curable composition was 1h20. The amount of LiCl in this example was the same as in curable composition A1.

2) Suprasec 2020 (85 pbw) and Daltocel F526 (15 pbw) were mixed. The Daltocel F526 contained 0.24% by weight of potassium lactate (calculated on the weight of the polyol). The index was 1763. The pot-life was 2 minutes.

3) 1 mol of LiCl was combined with 5 parts by weight of urea compound A (see Table 1). The molar ratio of salt/NCO was about 1.5. It was not possible to dissolve the LiCl in the urea compound.

The invention claimed is:

1. A curable polyisocyante composition which is stable at ambient conditions comprising a polyisocyanate, a lithium halide, a urea compound, and an epoxy resin, the urea compound having an average molecular weight of 500-15000 and, optionally, comprising biuret groups, the number of moles of lithium halide per isocyanate equivalent ranging of from 0.0001-0.04, and the number of urea+biuret equivalents per isocyanate equivalent of from 0.0001-0.4, and wherein the amount of epoxy resin is such that the number of epoxy equivalents per isocyanate equivalent ranges from 0.003-1.

2. The polyisocyante composition according to claim 1, wherein the urea compound comprises isocyanate-reactive groups selected from the group consisting of urea groups.

3. The polyisocyante composition according to claim 1, wherein the polyisocyanate is a methylene diphenyl diisocyanate or a polyisocyanate composition comprising methylene diphenyl diisocyanate or a mixture of such polyisocyanates.

4. The polyisocyante composition according to claim 1, wherein the amount of lithium halide is 0.00015-0.025 moles per isocyanate equivalent.

5. The polyisocyante composition according to claim 1, wherein the lithium halide is lithium chloride.

6. The polyisocyante composition according to claim 1, wherein the number of urea+biuret equivalents per isocyanate equivalent is 0.001-0.2.

7. The polyisocyante composition according to claim 1, wherein the urea compound has been prepared by reacting a methylene diphenyl diisocyanate or a polyisocyanate comprising a methylene diphenyl diisocyanate or a mixture of these polyisocyanates with a polyoxyalkylene monoamine comprising oxypropylene groups in an amount of at least 50% by weight calculated on the total weight of the monoamine molecule and having an average molecular weight of 200-3000 and wherein the amine is a primary amine.

8. The polyisocyante composition according to claim 1, wherein the number of urea+biuret equivalents per mole of lithium halide is 0.5-60.

\* \* \* \* \*